United States Patent [19]

Ban

[11] 3,870,937

[45] Mar. 11, 1975

[54] SYSTEM FOR DRIVING A DIRECT-CURRENT MOTOR IN SYNCHRONISM WITH AN EXTERNAL SIGNAL

[76] Inventor: Itsuki Ban, 829, Higashi-Oizumimachi, Nerima-ku, Tokyo, Japan

[22] Filed: Aug. 3, 1973

[21] Appl. No.: 385,579

[30] Foreign Application Priority Data

Aug. 14, 1972    Japan............................... 47-80788

[52] U.S. Cl.................... 318/314, 318/318, 318/341
[51] Int. Cl................................................. H02p 5/00
[58] Field of Search................... 318/314, 318, 341

[56]        References Cited
        UNITED STATES PATENTS

| | | | |
|---|---|---|---|
| 3,154,730 | 10/1964 | Houldin et al.............. | 318/318 X |
| 3,295,039 | 12/1966 | MacDonald et al. .......... | 318/318 X |
| 3,386,021 | 5/1968 | Fischer..................... | 318/314 UX |
| 3,478,178 | 11/1969 | Grace...................... | 318/318 X |
| 3,493,834 | 2/1970 | Worrall.................... | 318/314 |
| 3,522,503 | 8/1970 | Feulner.................... | 318/314 |
| 3,546,553 | 12/1970 | Loyd....................... | 318/318 |

*Primary Examiner*—G. Z. Rubinson

[57]    ABSTRACT

For driving a direct-current motor in step with the frequency of an external synchronizing signal regardless of abrupt changes in the load or in the synchronizing signal frequency, a rotor position signal in the form of a train of pulses is produced which is in phased relationship to the rotation of the motor. A first control circuit is provided which responds to each pulse of the synchronizing signal to initiate the flow of current from a DC power supply through the motor in its forward direction to cause the latter to produce driving torque and which also responds to each pulse of the rotor position signal to initiate the flow of current from the DC power supply through the motor in its reverse direction to cause the latter to produce retarding torque. This first control circuit is associated with a second control circuit, which causes the first control circuit to prevent the motor from producing the retarding torque when consecutively supplied with two pulses of the synchronizing signal, that is, when the motor is running at one half the required synchronous speed. The first control circuit is permitted to return to its normal operation when the second control circuit is succeedingly supplied with two consecutive pulses of the rotor position signal.

10 Claims, 11 Drawing Figures

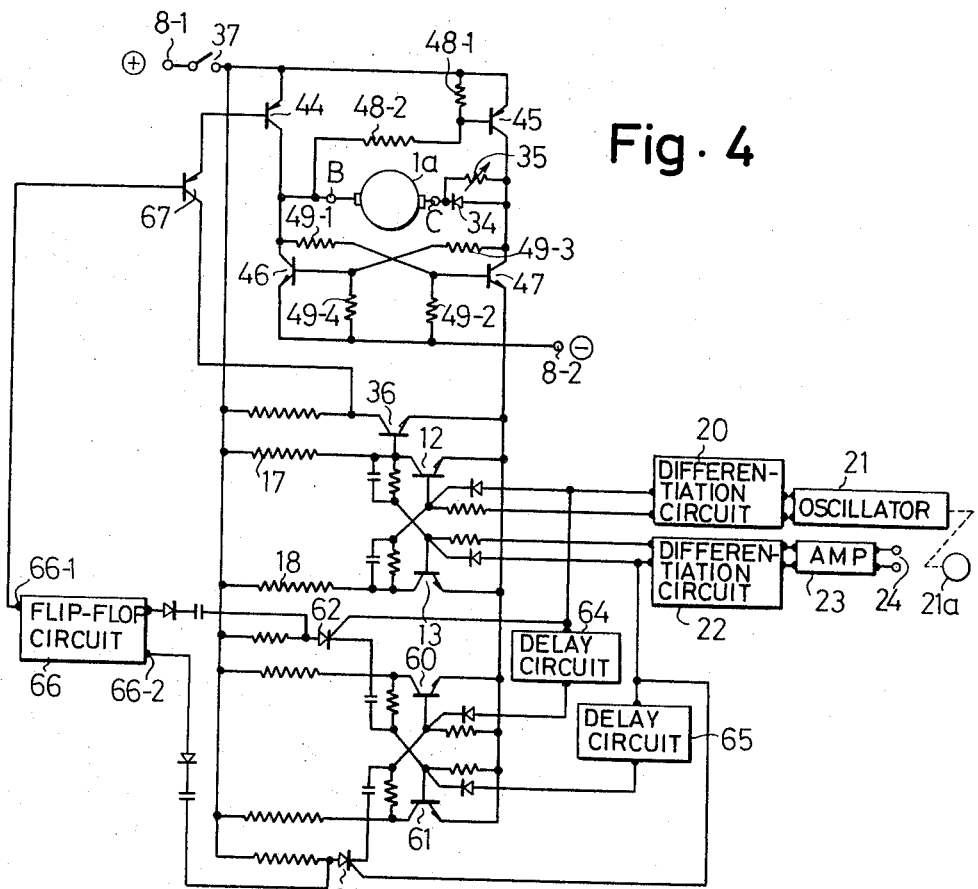
Fig. 4
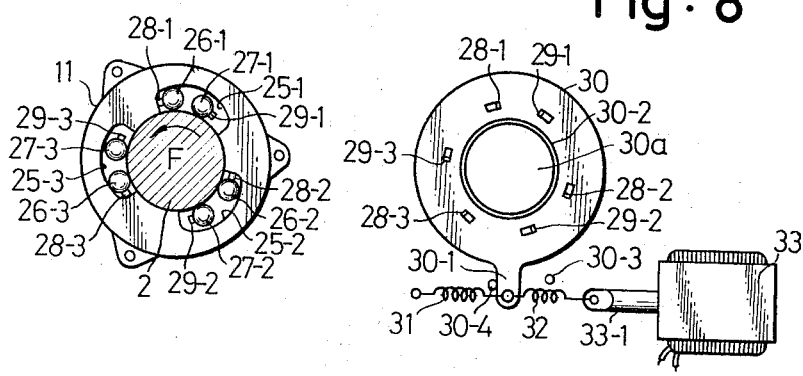
Fig. 7
Fig. 8

SYSTEM FOR DRIVING A DIRECT-CURRENT MOTOR IN SYNCHRONISM WITH AN EXTERNAL SIGNAL

BACKGROUND OF THE INVENTION

This invention relates generally to electric motors, and is more specifically directed to a system for controlling the speed of a direct-current motor with an external synchronizing signal so as to maintain the same at synchronous speed in spite of possible rapid changes in load or in the frequency of the synchronizing signal.

Synchronous motors have a distinct advantage over other types of motors, in that their speed of rotation is easily controllable in step with the frequency of an AC supply system to which they are connected. However, the synchronous motors are difficult of self-starting and, moreover, are forced to stop when they fall out of synchronism due to a rapid change in the load or in the AC supply frequency.

These disadvantages of the synchronous motors are totally non-existent in direct-current motors, which have no starting problems and which do not stop in spite of rapid changes in the load or in the supply voltage. However, the direct-current motors have their own drawback in connection with the difficulties involved in their speed control.

SUMMARY OF THE INVENTION

In view of the listed advantages and disadvantages of the prior art synchronous motors and direct-current motors, it is an object of this invention to provide a novel and improved system for speed control of a direct-current motor in step with an external synchronizing signal, such that the motor operates asynchronously during a starting period and runs on load substantially as a synchronous motor.

Another object of the invention is to provide a DC motor speed control system wherein the motor when loaded is caused to run in synchronism with an external synchronizing signal by being fed from a DC power supply as dictated by the synchronizing signal and a rotor position signal which is produced by the motor in phased relationship to the rotation of its rotor.

A further object of the invention is to provide a DC motor speed control system wherein the current from the DC power supply is caused to flow through the motor in alternately reversed directions to cause the same to produce driving torque and retarding torque in response to the synchronizing signal and the rotor position signal, whereby the motor can be faithfully maintained at synchronous speed even under varying load conditions.

A further object of the invention is to provide a DC motor speed control system wherein, in event the motor has fallen out of synchronism and has started running at least at one half the required synchronous speed, due to a rapid change in load, in supply voltage, or in synchronizing signal frequency, the motor is prevented from producing the retarding torque pending its acceleration to a speed slightly in excess of the synchronous speed whereupon the motor is automatically pulled back into synchronism.

A still further object of the invention is to provide a DC motor speed control system including means for preventing the rotation of the motor in a reverse direction, such that the motor is permitted to perform a stepping function in tune with the synchronizing signal.

The DC motor speed control system according to the invention is perhaps best adaptable for use with motors having relatively small inertial forces produced by their rotating parts, such as those known in the art as "cup motors" or "printed-coil motors." Itd is a notable advantage of the system according to the invention that the DC motor under control is prevented from making quasistable rotation, as when the motor is heavily loaded, at speed corresponding to an integral measure of the required synchronous speed.

The features which are believed to be novel and characteristic of this invention are set forth with particularity in the appended claims. The invention itself, however, both as to its organization and mode of operation, together with the further objects and advantages thereof, will be best understood from the following description of some preferred embodiments taken in conjunction with the accompanying drawings wherein like reference characters denote like parts or like signals throughout the several views or diagrams.

BRIEF DESCRIPTION OF THE DRAWINGS

FIG. 4 is a schematic electrical diagram of a DC motor speed control system configured by way of a preferred embodiment of the invention;

FIG. 7 is a front elevational view, partly in section, explanatory of means for preventing motor rotation in a reverse direction;

FIG. 8 is a view corresponding to FIG. 7 and showing a mechanism for changing the direction in which the motor is permitted to rotate, the mechanism being incorporated in the means of FIG. 7;

DESCRIPTION OF THE PREFERRED EMBODIMENTS

Figure 1:
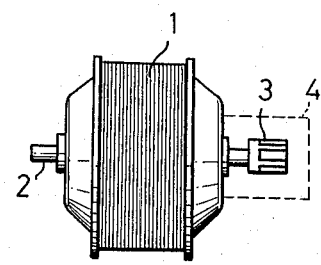
FIG. 1 is a side elevational view of an explanatory nature showing the construction of an example of direct-current motor to which is directed this invention.

Direct-current motors to which is directed this invention may be of the usual type comprising a commutator and brushes, or they may be semiconductor motors of brushless type. An exemplified direct-current motor 1 shown in FIG. 1 includes a shaft 2 carrying a commutator 3. A housing 4 is adapted to accommodate the commutator 3 and the usual brushes, not shown in FIG. 1, riding thereon.

As illustrated in more detail in FIG. 12, the commutator 3 is divided into segments 3-1, 3-2, 3-3 and 3-4 by slits 3a. The brush 5 rides on the commutator segments, and the other brush 6 on the portion 3-5 of the commutator functioning as a slip ring. The reference numerals 8-1 and 8-2 denote DC supply terminals. Hence, as the commutator 3 rotates in the direction of the arrow A, a train of pulses are developed across the terminals 8-2 and 8-3 via resistance 7. These pulses are in phased relationship to the rotation of the rotor in the DC motor 1 and are referred to as a "rotor position signal" or "rotor position pulses" in this specification and in the claims appended thereto.

Figure 3:
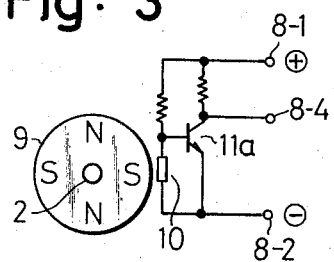
FIG. 3 is a view explanatory of alternative means for production of the rotor position signal.

A similar rotor position signal can also be generated by means shown in FIG. 3, in which a rotor 9 in the form of a cylindrical magnet is fixedly mounted on the rotor shaft 2. This rotor has alternating north and south poles N and S formed circumferentially htereon at angular spacings of 90°. Mounted opposite to the rotor 9 is a magnetoresistive element 10 such that its resistance changes in step with the rotation of the rotor to alternatingly cause conduction and nonconduction through transistor 11a. The pulses thus generated across the terminals 8-1 and 8-4 constitute the aforesaid rotor position signal. It will be understood that the intervals between these rotor position pulses are regulatable at will by changing the position of the magnetoresistive element 10 with respect to the poles of the rotor 9.

The DC motor speed control system according to the invention is best represented by the circuit diagram of FIG. 4, in which the rotor of the DC motor under consideration is indicated at 1a. A pair of transistors 12 and 13 constitute in combination a flip-flop circuit. A multivibrator or oscillator is provided at 21 to produce a rectangular wave output which is utilized as a synchronizing signal, and the frequency of its oscillations is regulatable as by the manual turn of a knob 21a. The rectangular wave output from the oscillator is delivered to a differentiator 20, and each of the train of differentiated synchronizing pulses thus proproduced causes conduction through the transistor 12, and nonconduction through the other transistor 13, of the flip-flop circuit.

Figure 2:
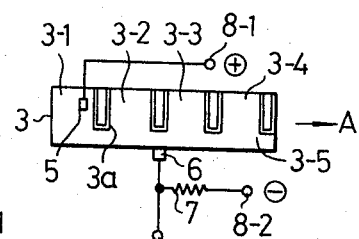
FIG. 2 is a schematic developed view of a commutator and associated means in the direct-current motor of FIG. 1 which are adapted for the production of a rotor position signal.

A pair of terminals 24 are adapted to receive the rotor position signal from the terminals 8-2 and 8-3, FIG. 2, or from the terminals 8-1 and 8-4, FIG. 3. The rotor position signal thus supplied through the terminals 24 is delivered to an amplifier 23, where the signal is shaped into a rectangular wave, and this rectangular wave output from the amplifier is delivered to a differentiator 22. Each of the train of differentiated rotor position pulses produced by the differentiator 22 causes conduction through the transistor 13, and nonconduction through the transistor 12, of the aforesaid flip-flop circuit.

The DC supply terminal 8-1 is connected to a power switch 37. Four transistors 44, 45, 46 and 47 are interconnected in the form of a bridge circuit. The transistor 44 becomes conductive when its base voltage drops, with the result that the transistor 45 becomes nonconductive as its base voltage is caused to rise via resistances 48-1 and 48-2. The transistor 47 becomes conductive as its base voltage is caused to rise via resistances 49-1 and 49-2, and the transistor 46 becomes nonconductive as its base voltage is caused to drop via resistances 49-3 and 49-4. As a consequence, the electric current from the DC power supply is caused to flow through the rotor 1a in the right-hand direction, as seen in FIG. 4, via variable resistor 35. It is of course assumed that a transistor 60 is now held conductive.

When the base voltage of the transistor 44 rises to render the same nonconductive, all the other transistors 45, 46 and 47 are switched from the above specified states to cause the flow of current through the rotor 1a in the left-hand direction via diode 34. Thus, by the switching function of the transistor 44, the DC motor under control is caused to produce torque in its forward or reverse direction. The torque thus produced in the forward direction is hereinafter referred to as "driving torque" and that in the reverse direction as "retarding torque."

Upon conduction of the transistor 12 of the aforesaid flip-flop circuit, a transistor 36 becomes nonconductive, so that the transistor 44 of the bridge circuit also becomes nonconductive. When the transistor 12 becomes nonconductive, on the other hand, the transistors 36 and 44 both become conductive. It will accordingly be understood that each synchronizing pulse supplied to the flip-flop circuit consisting of the transistors 12 and 13 results in the flow of current through the rotor 1a in the left-hand direction and thus in the production of driving torque, and that each rotor position pulse supplied to the flip-flop circuit results in the flow of current through the rotor in the right-hand direction and thus in the production of retarding torque. If the connections of terminals B and C to the rotor 1a are switched by means not shown in the drawing, the driving and retarding torque will be produced by the flow of current through the rotor in the directions opposite to those specified above. The variable resistor 35 is adapted to produce retarding torque in accordance with the load imposed on the motor. The circuit composed of the elements described in the foregoing with reference to FIG. 4 is hereinafter referred to as a "first control circuit".

Figure 5:
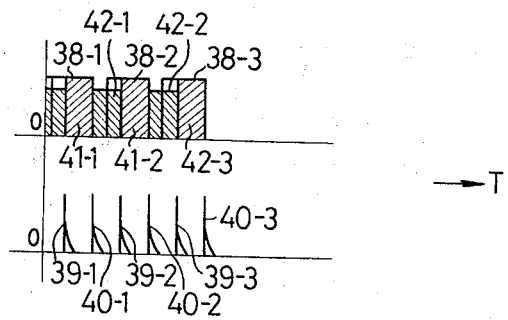
FIG. 5 is a graphic representation of driving pulses and retarding pulses as formed by the rotor position signal and an external synchronizing signal during normal operation of the motor.

Reference is now directed to FIG. 5 in order to describe the functions of the above described system of the invention under normal operating conditions. In the graph of FIG. 5, the rotor position pulses produced by the amplifier 23 of FIG. 4 are indicated at 38-1, 38-2 and 38-3, the differentiated synchronizing pulses produced by the differentiator 20 at 39-1, 39-2 and 39-3, and the differentiated rotor position pulses produced by the differentiator 22 at 40-1, 40-2 and 40-3. As previously mentioned, each of the differentiated synchronizing pulses 39-1, 39-2 ... initiates the supply of electrical energy to the DC motor, while each of the differentiated rotor position pulses 40-1, 40-2 ... terminates the supply of electrical energy thus initiated, so that there are obtained what are referred to in this specification as "driving pulses" 41-1, 41-2 ... during which durations the motor is fed from the DC power supply to produce the aforesaid driving torque. Since the differentiated rotor position pulses 40-1, 40-2 ... switch the transistors 44 to 47 in bridge connection, the motor is then fed from the DC power supply in the reverse direction to produce the retarding torque during the durations of what are termed "retarding pulses" 42-1, 42-2 ... The magnitude of these retarding pulses is regulatable by the variable resistor 35 as aforesaid.

Upon decrease in the load or in the frequency of the synchronizing signal, the rotor position pulses 38-1, 38-2 ... are produced in such a manner that the durations of the driving pulses 41-1, 41-2 ... are correspondingly decreased while the durations of the retarding pulses 42-1, 42-2 ... are correspondingly increased. The motor is thus caused to decelerate to synchronous speed without any substantial delay.

Upon increase in the load or in the frequency of the synchronizing signal, on the other hand, the rotor position pulses 38-1, 38-2 ... are produced in such a manner that the durations of the driving pulses are correspondingly increased while the durations of the retarding pulses are correspondingly decreased, thereby maintaining the motor at synchronous speed. It may also be noted that in event "negative" load is imposed on the motor, the durations of the retarding pulses will become longer than those of the driving pulses thereby permitting the motor to produce as much retarding torque as required.

At the time of starting, the time intervals between the differentiated rotor position pulses 40-1, 40-2 ... are so long, with a number of differentiated synchronizing pulses 39-1, 39-2 ... interposed therebetween, that the motor will speed up without production of any retarding torque until synchronous speed is attained. The motor thus operates as a direct-current motor at the time of starting and as a synchronous motor during synchronous operation, thereby combining the advantages of both types of motors.

The motor under control according to the invention can be equipped with means for preventing its rotation in the reverse direction, as illustrated by way of example in FIGS. 7 and 8. A substantially annular enclosure 11 is fixedly supported by some stationary part of the motor and is loosely mounted on its shaft 2. The enclosure 11 has a plurality of, three in this embodiment, cam grooves 25-1, 25-2 and 25-3 which are open to the shaft 2, and a pair of balls 26-1 and 27-1, 26-2 and 27-2, and 26-3 and 27-3 are accommodated within each of the cam grooves so as to be in contact with the circumference of the shaft 2. The balls may be made of steel or the like. Upon rotation of the shaft 2 in the direction of the arrow F indicated in FIG. 7, the balls 26-1, 26-2 and 26-3 will be urged against the circumference of the shaft to prevent its rotation in that direction.

The respective pairs of balls accommodated within the cam grooves of the enclosure 11 are provided with stops 28-1 and 29-1, 28-2 and 29-2, and 28-3 and 29-3, which are adapted to limit the motion of the respective pairs of balls along the circumference of the shaft 2. As illustrated in more detail in FIG. 8, these stops are formed integral with a ring 30 having a central aperture 30a and an internal flange 30-2 through which the ring is to be loosely mounted on the shaft 2. The ring 30 has a tongue 30-1 formed integral therewith, and a helical tension spring 31 extends between this tongue and some stationary part of the motor to cause the ring to tend to turn clockwise as seen in FIG. 8. Another helical tension spring 32 extends from the tongue 30-1 in the opposite direction to be coupled to a plunger 33-1 of a solenoid 33, the force of the spring 32 being greater than that of the first mentioned spring 31. A pair of stops 30-3 and 30-4 are provided on both sides of the tongue 30-1 to limit the angle of rotation of the ring 30.

Hence, when the solenoid 33 is energized, the plunger 33-1 is pulled into the same to cause the ring 30 to turn counterclockwise. The plunger 33-1 and the ring 30 return to their respective positions illustrated in FIG. 8 when the solenoid 33 is de-energized. With such bidirectional rotation of the ring 30, the balls within the cam grooves of the enclosure 11 change their positions as determined by the stops 28-1, 29-1 ... The motor shaft 2 is prevented from counterclockwise rotation when the solenoid 33 is energized, and from a clockwise rotation when the solenoid is de-energized. To accomplish the same objects, three balls may be arranged side by side within each of the cam grooves 25-1 to 25-3.

The solenoid 33 may be controlled as by a push-button switch not shown in the drawings, and the connections of the terminals B and C to the motor shown in FIG. 4 may be switched as required by means of a relay or the like also not shown. It is necessary, however, that the motor be free to rotate in the direction in which it is caused to rotate upon production of each of the aforesaid synchronizing pulse but that the motor be prevented from rotation in the opposite direction in which it is caused to tend to rotate upon production of each rotor position pulse. Under some operating conditions which do not require motor rotation in the reverse direction, the means shown in FIGS. 7 and 8 can be replaced by the known means which prevent motor rotation in one prescribed direction only. It will also be understood that the means of FIGS. 7 and 8 are replaceable by any other known or suitable means of equivalent functions, such as those operating electronically, without departing from the scope of this invention in its broader aspects.

Figure 6:
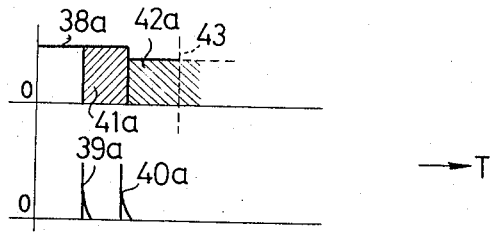
FIG. 6 is also a graphic representation of the driving and retarding pulses as formed during stepping operation of the motor.

The provision of the above described means for preventing motor rotation in the reverse direction results in the following advantages. Upon production of a differentiated synchronizing pulse 39a by the differentiator 20 shown in FIG. 4, there is obtained the aforesaid driving pulse 41a during the duration of which the motor under control is fed from the DC power supply for rotation in the forward direction, as will be seen from the graphic representation of FIG. 6. The pulse 38a shown in this graph is that which is produced by the amplifier 23 of FIG. 4. The supply of electrical energy to the DC motor is suspended upon production of a differentiated rotor position pulse 40a by the differentiator 22 of FIG. 4. The driving pulse 41a is now replaced by a retarding pulse 42a during the duration of which the motor is fed from the DC power supply so as to produce retarding torque.

As a consequence, the motor rapidly decelerates, stops, and tends to rotate in the reverse direction. Since the rotation of the motor in the reverse direction is prevented as by means shown in FIGS. 7 and 8, the motor stops at the moment indicated by the numeral 43 in FIG. 6. Upon production of the succeeding synchronizing pulse the motor is set in rotation again in its forward direction and is caused to stop after rotation through a predetermined angle. The motor thus makes the so-called stepping operation, in which the angle of rotation at each step corresponds to the time interval at which the successive rotor position pulses are produced.

Accordingly, the stepping operation with a minimum angle of motor rotation at each step can be realized if the angular spacings between the segments of the commutator shown in FIG. 2 or between the poles of the rotor shown in FIG. 3 are correspondingly decreased.

Such minimum angle of rotation at each step permits the motor to run in exact synchronism with the frequency of the synchronizing signal produced by the oscillator 21 shown in FIG. 4. It will be understood that the motor rapidly decelerates and stops upon termination of the production of the synchronizing signal. It will also be apparent that the motor makes the stepping operation in the opposite direction if the connections of the terminals B and C thereto are switched and if the ring 30 is turned in the direction required. Should the means of FIGS. 7 and 8 be not provided, the motor would not make the stepping function at low speed and would become suitable for operations at high speed only.

Figure 9:
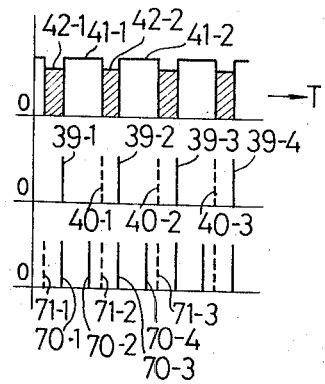
FIG. 9 is a graphic representation of the various pulses generated in event the motor is running at one half the required synchronous speed.

It is important to note that the DC motor speed control system of the invention as so far disclosed is open to some drawbacks arising when the motor is relatively heavily loaded, and especially at the time of its starting. Such drawbacks are explained hereinbelow with reference to the graph of FIG. 9, in which the differentiated synchronizing pulses 39-1, 39-2 ... and the differentiated rotor position pulses 40-1, 40-2 ... are generated alternately to produce the driving pulses 41-1, 41-2 ... and the retarding pulses 42-1, 42-2 ... during normal motor operation at synchronous speed.

However, also as indicated in the same graph, these driving pulses and retarding pulses are produced in the same manner even though each two consecutive synchronizing pulses 70-1, 70-2 ... are interposed between the adjacent rotor position pulses 71-1, 71-2 ... The motor is then in rotation at one half the normal synchronous speed, while the load applied to the motor is the same as when the synchronizing pulses and the rotor position pulses are produced alternatively as in the graph of FIG. 9. This phenomenon takes place only when the durations of the driving pulses are appreciably longer than the durations of the retarding pulses, that is, when the motor is heavily loaded. It is even possible that the motor rotate at one third the normal synchronous speed.

In order to prevent this, the DC motor speed control system according to the invention is equipped with a second control circuit which also is illustrated in FIG. 4. The second control circuit includes a flip-flop circuit composed of a pair of transistors 60 and 61. The transistor 60 becomes conductive, and the transistor 61 nonconductive, when each differentiated synchronizing pulse is delivered from the differentiator 20 to the base of the former transistor via delay circuit 64. Although the differentiated synchronizing pulse is also delivered to the gate terminal of a silicon-controlled rectifier (SCR) 62, this SCR is not triggered because then no voltage is impressed across its anode and cathode.

The transistor 61 becomes conductive, and the transistor 60 nonconductive, when each differentiated rotor position pulse is delivered from the differentiator 22 to the base of the transistor 61 via delay circuit 65. The differentiated rotor position pulse is also delivered to the gate terminal of an SCR 63, but the same is not triggered because then no voltage is impressed across its anode and cathode. In this manner the silicon-controlled rectifiers 62 and 63 are both held inoperative while being supplied alternately with the differentiated synchronizing pulses and rotor position pulses, that is, during normal motor operation at synchronous speed.

However, as the motor starts running at one half the required synchronous speed, two consecutive differentiated synchronizing pulses are delivered as aforesaid to the base of the transistor 60 and to the gate terminal of the SCR 62. The first of the two consecutive pulses causes conduction through the transistor 60 but is still incapable of triggering the SCR 62. Upon delivery of the next pulse to its gate terminal, the SCR 62 is triggered because then the transistor 60 is held conductive to apply a voltage across the anode and cathode of the SCR.

Thereupon the SCR 62 energizes a flip-flop circuit 66, causing the same to deliver a positive output from its terminal 66-1 to the base of a transistor 67. As this transistor 67 resultantly becomes nonconductive, the aforementioned transistor 44 is also rendered nonconductive, with the result that the current from the DC power supply is held flowing through the rotor 1a of the motor under control in the left-hand direction as seen in FIG. 4. The motor is thus caused to accelerate until it starts running slightly in excess of synchronous speed, whereupon the normal synchronous operation of the motor is regained.

Figure 10:
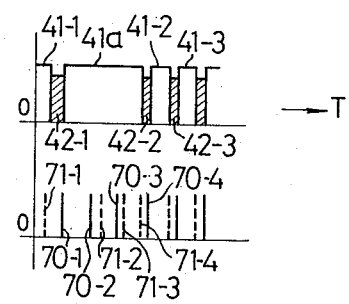
FIG. 10 is also a graphic representation of the various pulses generated when the motor is pulled back into synchronism after running at one half the required synchronous speed.

The above described operation of the second control circuit according to the invention is hereinafter explained in terms of the pulses as graphically represented in FIG. 10. When the SCR 62 is triggered as above stated, there are two differentiated rotor position pulses 71-1 and 71-2. As the motor is succeedingly caused to accelerate through the procedure previously set forth, two differentiated rotor position pulses 71-3 and 71-4 will be interposed between the adjacent differentiated synchronizing pulses 70-3 and 70-4.

These two consecutive pulses are delivered to the base of the transistor 61, FIG. 4, so that the SCR 63 associated with this transistor is triggered. As the signal is resultantly delivered to the flip-flop circuit 66 via its input terminal 66-2, this flip-flop circuit is switched to lower the base voltage of the transistor 67. Thereafter the transistor 44 is rendered conductive and nonconductive in step with the conduction and nonconduction of the transistor 36, as described earlier in this specification, so that the motor is caused to run at synchronous speed.

As will be understood from the foregoing description of the second control circuit according to the invention, the flip-flop circuit consisting of the transistors 60 and 61 produces no output as long as the motor is running at synchronous speed. As the motor starts running at one half the synchronous speed, however, the flip-flop circuit 66 is energized via the SCR 62 with the result that the motor is held fed from the DC power supply for acceleration to speed slightly in excess of the synchronous speed. Synchronous motor operation is thus regained as the rotor position pulses and the synchronizing pulses are produced alternately thereafter. Such procedure of automatic motor speed readjustment is represented by the driving pulses 41a and 41-2, 42-3 ... in the graph of FIG. 10.

Figure 11:
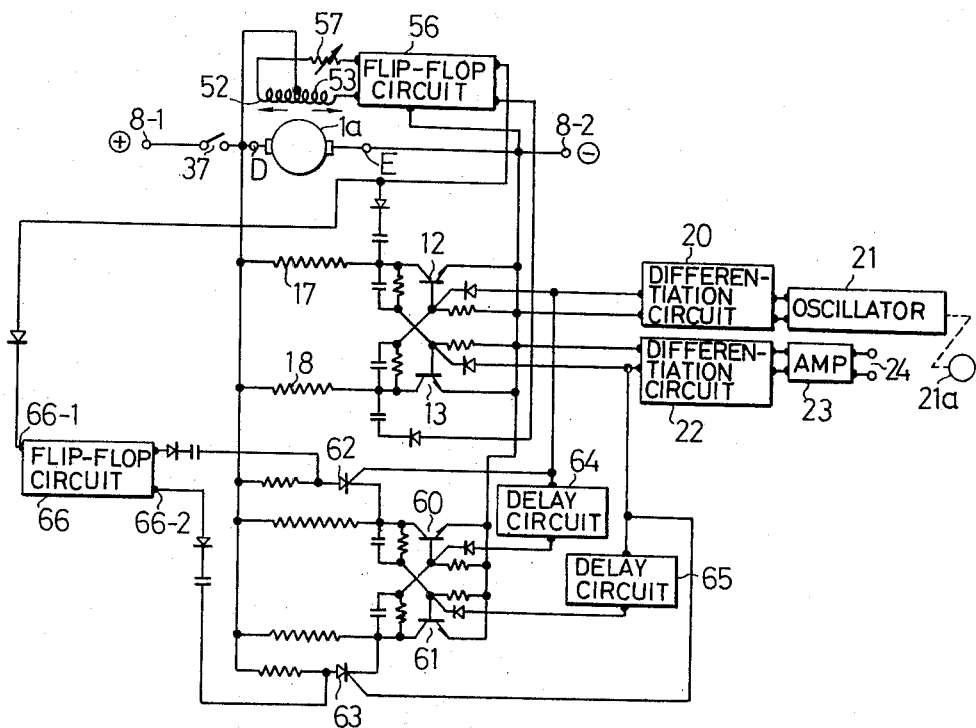
FIG. 11 is a schematic electrical diagram showing another preferred embodiment of the invention.

FIG. 11 illustrates another preferred embodiment of this invention, in which the control system of the invention is adapted for a different type of direct-current motor having the rotor 1a and field coils 52 and 53 connected as in the drawing. Upon delivery of each differentiated synchronizing pulse from the differentiator 20 to the base of the transistor 12, which makes up a flip-flop circuit in combination with the transistor 13 as previously mentioned, a negative pulse is supplied to a flip-flop circuit 56, so that the current from the DC power supply starts flowing through the field coil 53 in the arrow-marked direction. The rotor 1a of the motor under control in this second embodiment of the invention thus starts revolving in its forward direction.

Upon delivery of each differentiated rotor position pulse from the differentiator 22 to the base of the transistor 13, a negative pulse due to the voltage drop across the resistance 18 is supplied to the flip-flop circuit 56 thereby switching the same. The current from the DC power supply is now caused to flow through the other field coil 52 in its arrow-marked direction, so that the rotor 1a produces the required retarding torque by being cuased to tend to rotate in the reverse direction. It is assumed that this motor is also provided with the means of FIGS. 7 and 8 for preventing its rotation in the reverse direction. A variable resistor 57 connected between the flip-flop circuit 56 and the field coil 52 is adapted to regulate the magnitude of the current causing the motor to tend to rotate in the reverse direction.

It will be apparent that in this second embodiment of the invention, too, each synchronzing pulse causes the motor to produce driving torque and that each rotor position pulse causes the same to produce retarding torque. Accordingly, the driving pulses and the retarding pulses delivered to the motor for its synchronous rotation are exactly as graphically represented in FIG. 5.

Moreover, since the motor under control in this second embodiment is also provided with the means for preventing its rotation in the reverse direction as shown in FIGS. 7 and 8, the motor is capable of performing the stepping function and, further, is caused to stop upon termination of the production of the synchronizing signal, as described previously in connection with the first embodiment of the invention. It will likewise be apparent that the direction of motor rotation can be reversed if the connections of the terminals D and E, FIG. 11, to the rotor 1a are switched. Also as in the preceding embodiment, such reversal of the direction of motor rotation necessitates the corresponding change in the angular position of the ring 30 shown in FIG. 8 in particular.

The second control circuit shown in FIG. 11, which conprises the transistors 60 and 61, the silicon-controlled rectifiers 62 and 63, and so forth, is of exactly the same configuration and operation as that provided in the preceding embodiment. Accordingly, the motor is likewise prevented from making quasistable rotation at one half the required synchronous speed but is always maintained in normal synchronous operation.

While it is believed that the various objects of the invention, either explicitly stated or otherwise set forth, are fully accomplished by the preferred embodiments disclosed herein, it will also be understood that such specifically recited embodiments are subjects to various modifications or changes within the usual knowledge of those skilled in the art. It is therefore appropriate that the invention be construed broadly and in a manner consistent with the fair meaning or proper scope of the claims appended hereto.

I claim:

1. A system for driving a direct-current motor in synchronism with an external synchronizing signal in the form of a train of pulses, said system comprising:
   a DC power supply for feeding said motor;
   means for producing said synchronizing signal;
   means for producing a rotor position signal in phased relationship to the rotation of said motor, said rotor position signal being also in the form of a train of pulses;
   a first control circuit for initiating the flow of current from said DC power supply through said motor in a forward direction thereof to cause the latter to produce driving torque when supplied with each pulse of said synchronizing signal, and for initiating the flow of current from said DC power supply through said motor in a reverse direction to cause the latter to produce retarding torque when supplied with each pulse of said rotor position signal; and
   a second control circuit for controlling the operation of said first control circuit, said second control circuit including:
      a first sensing circuit sensitive to at least two consecutive pulses of said synchronizing signal interposed between the adjacent pulses of said rotor position signal to render said first control circuit inoperative thereby preventing said motor to produce the retarding torque; and
      a second sensing circuit sensitive to at least two consecutive pulses of said rotor position signal interposed between the adjacent pulses of said synchronizing signal to permit said first control circuit to return to its normal operative condition.

2. The system as recited in claim 1, wherein said first control circuit comprises:
   a switching circuit switched between a first and a second state, said switching circuit being switched to said first state in response to each pulse of said synchronizing signal and to said second state in response to each pulse of said rotor position signal;
   a driving circuit for causing the flow of current from said DC power supply through said motor in the forward direction when said switching circuit is switched to said first state; and
   a retarding circuit for causing the flow of current from said DC power supply through said motor in the reverse direction when said switching circuit is switched to said second state.

3. The system as recited in claim 2, wherein said driving circuit and said retarding circuit of said first control circuit share a flip-flop circuit, said flip-flop circuit being switched to a first stable state when said switching circuit has assumed said first state and to a second stable state when said switching circuit has assumed said second state, whereby the flow of current from said DC power supply is caused through said motor in the forward direction when said flip-flop circuit has assumed said first stable state, and in the reverse direction when said flip-flop circuit has assumed said second stable state.

4. The system as recited in claim 3, wherein said second control circuit comprises:
   a second flip-flop circuit shared by said first and said second sensing circuits, said second flip-flop circuit being alternately switched between a third and a fourth stable state in response to each pulse of said synchronizing signal and said rotor position signal;
   a first switching element included in said first sensing circuit, said first switching element being rendered conductive when triggered by said synchronizing signal while said second flip-flop circuit is in said second stable state;

a second switching element included in said second sensing circuit, said second switching element being rendered conductive when triggered by said rotor position signal while the first mentioned flip-flop circuit is in said second stable state; and a third flip-flop circuit switched between a fifth and a sixth stable state, said third flip-flop circuit being switched to said fifth stable state in response to the conduction of said first switching element and to said sixth stable state in response to the conduction of said second switching element;

whereby when said third flip-flop circuit is switched to said fifth stable state, said switching circuit of said first control circuit being electrically disconnected from the first mentioned flip-flop circuit to maintain the latter in said first stable state, the normal electrical relationship between said switching circuit and the first mentioned flip-flop circuit being regained when said third flip-flop circuit is switched to said sixth stable state.

5. The system as recited in claim 4, wherein each of said first and said second switching elements is a silicon-controlled rectifier.

6. The system as recited in claim 5, wherein said synchronizing signal is delivered via a first delay circuit to said second flip-flop circuit and directly to the gate terminal of said silicon-controlled rectifier employed in place of said first switching element, and wherein said rotor position signal is delivered via a second delay circuit to said second flip-flop circuit and directly to the gate terminal of said silicon-controlled rectifier employed in place of said second switching element.

7. The system as recited in claim 1, further comprising means for permitting said motor to rotate in one direction only.

8. The system as recited in claim 7, wherein said means for permitting said motor to rotate in one direction only comprises:

a substantially annular enclosure loosely mounted on the shaft of said motor, said enclosure being immovably supported by a stationary part of said motor so that said shaft is free to rotate relative to said enclosure, and said enclosure having a plurality of cam grooves formed therein which are open to the circumference of said shaft;

at least one ball accommodated in each of said cam grooves of said enclosure;

a ring loosely mounted on said shaft of said motor so as to be rotatable relative to each other;

a pair of stops extending from said ring into each of said cam grooves to limit the motion of said ball along the circumference of said shaft, in such a manner that said shaft is permitted to rotate in one direction only and is prevented from rotation in the other direction as then said ball in each of said cam grooves is thereby urged against the circumference of said shaft with the start of rotation thereof in said other direction; and means for turning said ring between a first and a second predetermined angular position to vary the position of said ball relative to each of said cam grooves, whereby said shaft is permitted to rotate in said other direction and is prevented from rotation in said one direction as said ring is turned from said first to said second predetermined angular position.

9. The system as recited in claim 8, wherein said means for turning said ring comprises a spring member urging said ring to said first predetermined angular position, and solenoid means effective to turn said ring to said second predetermined angular position against the force of said spring member when energized.

10. The system as recited in claim 9, wherein said solenoid means is operated in relation with the direction of flow of the current from said DC power supply through said motor.

* * * * *